(12) United States Patent
Karlsson

(10) Patent No.: US 12,539,736 B2
(45) Date of Patent: Feb. 3, 2026

(54) FRESH AIR INTAKE DEVICE FOR A VEHICLE

(71) Applicants: Ningbo Geely Automobile Research & Development Co., Ltd., Ningbo (CN); Zhejiang Geely Holding Group Co., Ltd., Zhejiang (CN)

(72) Inventor: Anders Karlsson, Västra Frölunda (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 361 days.

(21) Appl. No.: 18/235,813

(22) Filed: Aug. 19, 2023

(65) Prior Publication Data

US 2023/0391166 A1 Dec. 7, 2023

Related U.S. Application Data

(63) Continuation of application No. PCT/CN2022/078739, filed on Mar. 2, 2022.

(30) Foreign Application Priority Data

Mar. 5, 2021 (EP) .................................... 21160970

(51) Int. Cl.
*B60H 1/00* (2006.01)
*B60H 1/24* (2006.01)
*B60H 1/34* (2006.01)

(52) U.S. Cl.
CPC ........... *B60H 1/245* (2013.01); *B60H 1/3407* (2013.01)

(58) Field of Classification Search
CPC ......... B60H 1/24; B60H 1/245; B60H 1/3407
USPC ......................................................... 296/208
See application file for complete search history.

(56) References Cited

U.S. PATENT DOCUMENTS

| 2007/0184770 | A1  | 8/2007  | Shibata |           |
|--------------|-----|---------|---------|-----------|
| 2007/0293134 | A1  | 12/2007 | Shimada |           |
| 2010/0099347 | A1* | 4/2010  | Raible  | B60H 1/3407 |
|              |     |         |         | 454/76    |
| 2014/0113536 | A1  | 4/2014  | Goenka  |           |

(Continued)

FOREIGN PATENT DOCUMENTS

| CN | 101687458 A | 3/2010 |
| CN | 101730630 A | 6/2010 |
| CN | 110103676 A | 8/2019 |

(Continued)

OTHER PUBLICATIONS

International Search Report from corresponding International Application No. PCT/CN2022/078739, mailed on May 12, 2022, 2 pages.

*Primary Examiner* — Steven O Douglas
(74) *Attorney, Agent, or Firm* — Tucker Ellis LLP

(57) ABSTRACT

A fresh air intake device for a vehicle includes a pipe with a channel for providing air to a cabin of the vehicle. The pipe has a nozzle portion with a plurality of openings for distributing air into the cabin. The openings of the nozzle portion are arranged one after each other in a longitudinal extension direction of the pipe. A degree of taper of the air channel in the longitudinal extension direction of the pipe is adjustable for the nozzle portion for equalizing the distribution of air flowing through the openings.

16 Claims, 7 Drawing Sheets

(56) References Cited

U.S. PATENT DOCUMENTS

2018/0312043 A1 11/2018 Komatsubara
2023/0108324 A1* 4/2023 Hoppe ............... B60H 1/00871
454/137

FOREIGN PATENT DOCUMENTS

| DE | 2432246 A1 | 1/1976 |
| DE | 102004007552 B3 | 9/2005 |
| EP | 0713792 A1 | 5/1996 |
| GB | 721940 A | 1/1955 |
| GB | 2028492 A | 3/1980 |
| JP | 2006327489 A | 12/2006 |
| KR | 970034642 A | 7/1997 |
| WO | 2019170364 A1 | 9/2019 |

* cited by examiner

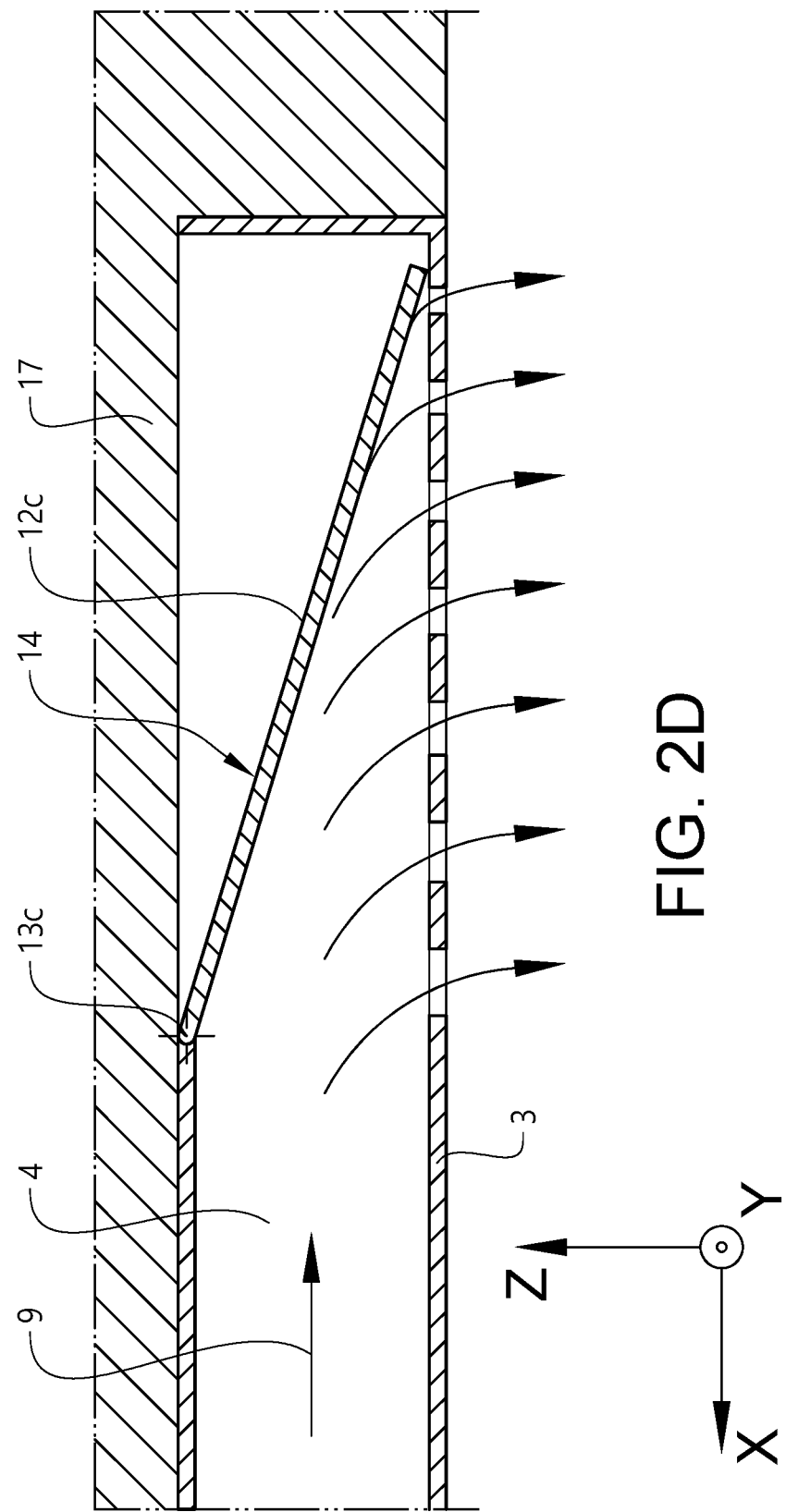

FRESH AIR INTAKE DEVICE FOR A VEHICLE

RELATED APPLICATION DATA

This application is a continuation of International Patent Application No. PCT/CN2022/078739, filed Mar. 2, 2022, which claims the benefit of European Patent Application No. 21160970.6, filed Mar. 5, 2021, the disclosures of which are incorporated herein by reference in their entireties.

TECHNICAL FIELD

The invention relates to a fresh air intake device for a vehicle which device comprises a pipe with a channel for providing air to a cabin of the vehicle.

BACKGROUND

A vehicle, such as a car with a HVAC system for instance, usually has equipment for providing air to the cabin of the vehicle. Fresh air is supplied by ducts arranged in the vehicle body and at the outlets of the ducts there are nozzles that can distribute the air into the cabin.

The airflow from a nozzle is often relatively concentrated which can be experienced as disturbing for the passenger of the vehicle. When used for a long time it can be more comfortable if the air is diffused into the cabin instead of being supplied as a concentrated airflow.

SUMMARY

An objective of the invention is to provide a fresh air intake device for a vehicle, for providing air to a cabin of the vehicle, by which device the same nozzle can be used for both diffusive and concentrated airflow.

The objective is achieved by a fresh air intake device for a vehicle, where the device comprises a pipe with a channel for providing air to a cabin of the vehicle, and the pipe has a nozzle portion with a plurality of openings for distributing air into the cabin, and the openings of the nozzle portion are arranged one after each other in a longitudinal extension direction of the pipe, wherein a degree of taper of the air channel in the longitudinal direction of the pipe is adjustable for the nozzle portion for equalizing the distribution of air flowing through the openings.

The invention is based on the insight that by such an air intake device, the airflow can be changed from a concentrated airflow to a more diffusive airflow, and vice versa, by a passenger of the vehicle or an automatic function of a HVAC-system. This can be performed without using additional nozzles or ducts for providing the air to the cabin. By providing the air without adjustment of the taper of the air channel, using a substantially constant cross section area of the air channel in the nozzle portion, the air tends to exit the nozzle portion mainly or only through the openings of the nozzle portion arranged closest to the downstream end of the nozzle portion, resulting in a concentrated airflow, whereas by adjusting the taper of the air channel such that the cross section area decreases along the nozzle portion, the air that exits through the openings at the upstream end of the nozzle portion will increase, giving a more equalized distribution of air flowing through the openings. In other words; a total airflow which is more evenly distributed over the openings of the nozzle portion, provides a more diffusive airflow into the cabin.

Each opening of the nozzle portion preferably has a direction with a radial direction component transverse to the longitudinal extension direction of the pipe. Optionally, the openings are arranged evenly spaced from each other along the nozzle portion. One or more rows of openings, where the openings are arranged one after each other in the longitudinal extension direction of the pipe, can be arranged in the nozzle portion.

The expressions "upstream" and "downstream" are used with respect to the intended main air flow direction in the air channel (i.e. in parallel with the longitudinal extension direction of the pipe).

According to one embodiment of the device, the sizes of the openings are different such that the opening size decreases along the nozzle portion in a direction from a first end of the nozzle portion to a second opposite end of the nozzle portion downstream the first end. Hereby, the equalization effect can be reinforced.

Although the adjustment may be performed stepwise, the degree of taper of the air channel of the nozzle portion is preferably continuously adjustable. Hereby, a lot of different adjustments of the taper can be achieved. Further, when the taper of the air channel of the nozzle portion is adjusted (increased), the air channel is preferably tapered in an intended main airflow direction of the pipe. This means the nozzle portion tapers such that the air channel becomes narrower downstream with respect to the main air flow direction of the pipe.

According to a further embodiment of the device, the nozzle portion constitutes an end portion of the pipe. Hereby, the taper can be varied for achieving the desired airflow without affecting any other nozzle downstream.

According to a further embodiment of the device, the taper of the air channel of the nozzle portion is adjustable such that at a first position of the nozzle portion, the air channel has a first cross section area, and at a second position of the nozzle portion, downstream the first position, the air channel has a second cross section area being less than 75% of the first cross section area. Hereby, the pressure drop in the nozzle portion can be increased giving an increased airflow through the openings at the upstream end of the nozzle portion.

The taper of the air channel of the nozzle portion is preferably adjustable such that the second cross section area is less than 50% of the first cross section area, and more preferably less than 25% of the first cross section area.

According to a further embodiment of the device, the taper of the air channel of the nozzle portion is adjustable such that the second cross section area is substantially zero. Hereby, it is possible to maximize the airflow through the openings at the upstream end of the nozzle portion.

According to a further embodiment of the device, when the taper of the air channel of the nozzle portion is adjusted, a plurality of the openings of the nozzle portion are situated upstream the second position, and a plurality of the openings of the nozzle portion are situated downstream the second position. Hereby, some openings at the downstream end of the nozzle portion can be blocked or the airflow through these openings can be heavily reduced.

According to a further embodiment of the device, the device comprises a pivot element arranged inside the pipe, where the pivot element is pivotally arranged relative to the pipe, and the degree of taper of the air channel of the nozzle portion is adjustable by pivoting the pivot element. Hereby, the taper of the air channel can be varied in a rational way by adjusting the tilting of the pivot element relative to the longitudinal extension direction of the pipe.

According to a further embodiment of the device, the pivot element is pivotally arranged relative to the pipe about a pivot point, wherein the pivot element has a first end comprising the pivot point and a second free end, and the pivot point is arranged upstream the second free end. Hereby, the air flow in the air channel can be forced to be more evenly distributed over the openings, while maintaining the entire air flow to pass the openings.

According to a further embodiment of the device, a part of a wall of the pipe is pivotally arranged relative to the remaining pipe, where the degree of taper of the air channel of the nozzle portion is adjustable by pivoting the pipe wall part. Hereby, the taper of the air channel can be varied in a rational way by adjusting the tilting of the pipe wall part relative to the longitudinal extension direction of the pipe. In addition, the design can be less complicated since no moving part has to be arranged inside the pipe.

Another aspect of the invention relates to vehicle comprising a fresh air intake device. The advantages of the vehicle are substantially the same as described for the fresh air intake device hereinabove.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings:

FIG. 2D shows a variant of the fresh air intake device illustrated in FIG. 2A, where the pivot element is constituted by a pipe wall part.

DETAILED DESCRIPTION OF EXAMPLE EMBODIMENTS

Figure 1A:
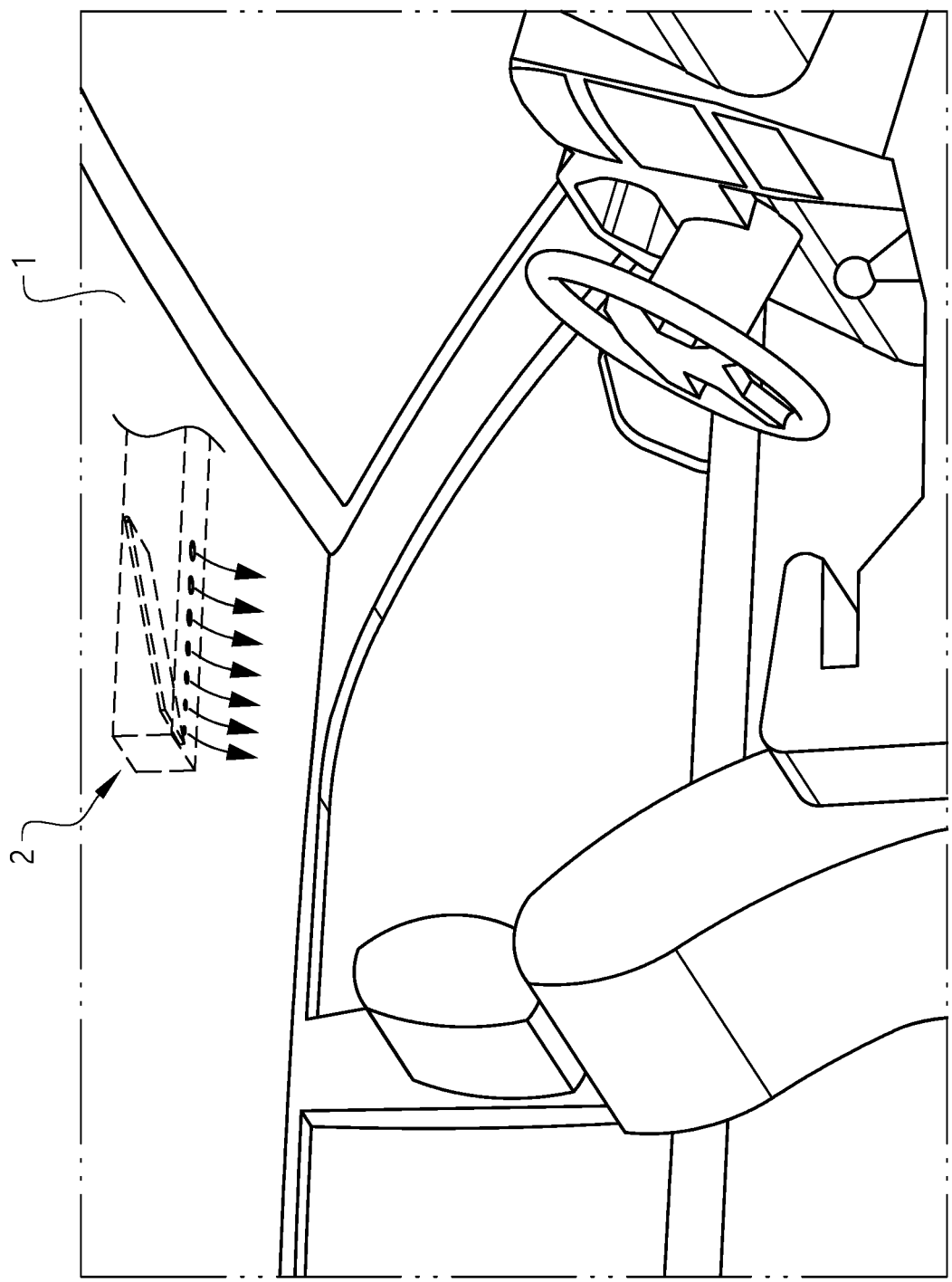
FIG. 1A is a perspective view of a part of a vehicle with a fresh air intake device for providing air to a cabin of the vehicle.

FIG. 1A shows in a perspective view a part of a vehicle 1 provided with a fresh air intake device 2 arranged in the ceiling of the vehicle 1. Although the fresh air intake device 2 is illustrated in a position for the front seat, in another application the air intake device can be positioned for the back seat. Further, the air intake device does not need to be arranged in the ceiling of the vehicle, but could also be positioned in any side wall of a vehicle cabin or other suitable position in a vehicle.

Figure 1B:
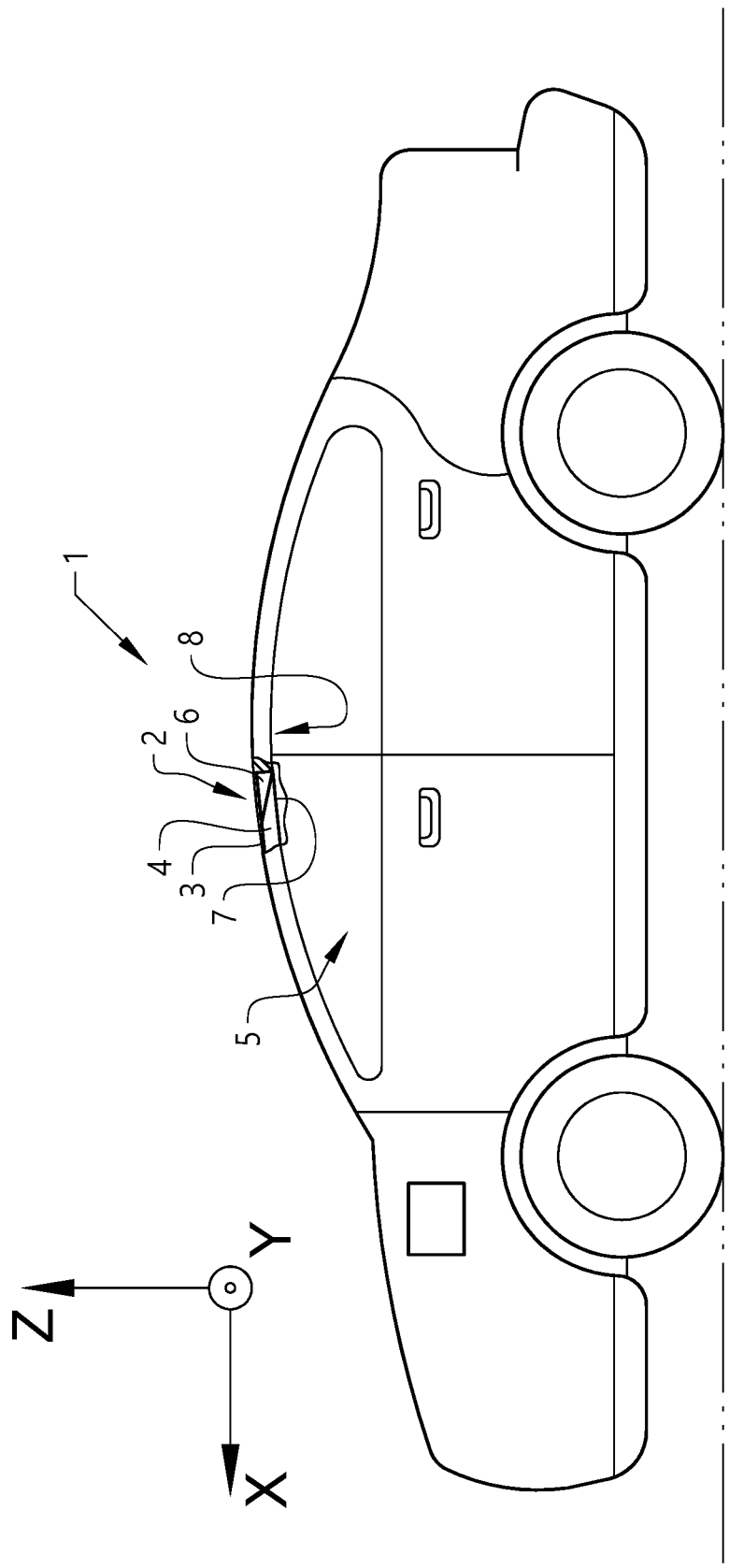
FIG. 1B is a side view of the vehicle illustrated in FIG. 1A.

FIG. 1B is a partly cut side view of the vehicle 1 showing the fresh air intake device 2. The device 2 comprises a pipe 3 with a channel 4 for providing air to a cabin 5 of the vehicle 1. The pipe 3 has a nozzle portion 6 with a plurality of openings 7 for distributing air into the cabin 5. The nozzle portion 6 is suitably arranged in the ceiling 8 of the vehicle 1 for providing an airflow into the cabin 5 having a flow component directed downwards.

In FIG. 1B, a cartesian coordinate system having an X-axis, a Y-axis and a Z-axis is also indicated. The X-axis is arranged in parallel with a longitudinal extension direction of the vehicle (i.e. the driving direction), the Z-axis is arranged in the vertical direction and a horizontal plane is defined by the X-axis and the Y-axis.

Figure 2A:
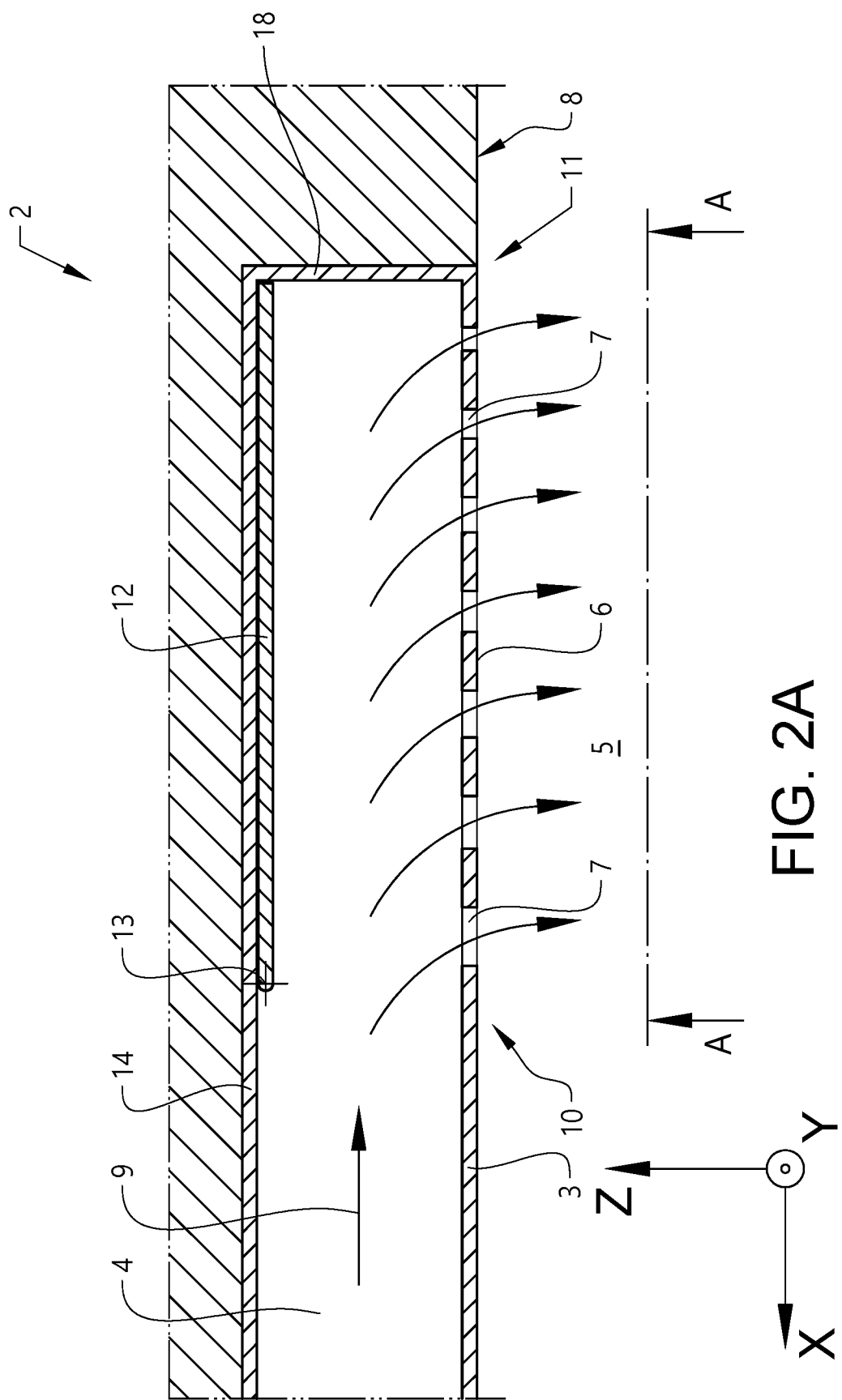
FIG. 2A is an enlarged view of the fresh air intake device illustrated in FIG. 1B.

FIG. 2A is an enlarged view of the fresh air intake device 2 illustrated in FIG. 1B. A part of the pipe 3 with the nozzle portion 6 is shown. A main flow direction of the air flowing in the channel 4 of the pipe 3, along a longitudinal extension direction of the pipe, is indicated by an arrow 9. This arrow 9 also indicates the longitudinal extension direction of the nozzle portion 6. In this example embodiment, the nozzle portion 6 is arranged such that the main flow direction 9 is substantially in parallel with the X-axis. Although, in another embodiment, the pipe 3 may continue to extend downstream the nozzle portion 6, in the embodiment illustrated in FIG. 2A, the nozzle portion 6 constitutes an end portion of the pipe 3. At an upstream end 10 of the nozzle portion 6, the air enters into the nozzle portion 6. At a downstream end 11 of the nozzle portion 6, the pipe 3 is closed by an end wall 18 or similar. Such a nozzle portion 6 can be a prepared end part of the pipe or a part mechanically connected to the pipe end.

The openings 7 of the nozzle portion 6 are arranged one after each other in the longitudinal extension direction of the pipe 3. Each opening 7 is suitably directed radially, or in other words; each opening 7 has a direction with a radial direction component transverse to the longitudinal extension direction of the nozzle portion 6 of the pipe 3 (and to the main airflow direction therein). When the nozzle portion 6 is arranged in the ceiling 8 as illustrated, the openings 7 of the nozzle portion 6 are suitably arranged on the underside of the nozzle portion 6. For example, the openings 7 can be directed downwards substantially in parallel with the Z-axis. Optionally, the openings can be directed obliquely downwards with a direction component in parallel with the Z-axis direction and a direction component in parallel with the Y-axis direction. The direction of the airflow through such an opening 7 may however also have a flow component directed (backwards) in parallel with the X-axis direction due to the main airflow direction 9 in the pipe 3.

Optionally, the openings can be directed with a direction component in the longitudinal extension direction of the nozzle portion. For example, in the illustrated example embodiment, the openings can be directed obliquely downwards and backwards with a direction component in parallel with the Z-axis direction and a direction component in parallel with the X-axis direction.

Figure 3:
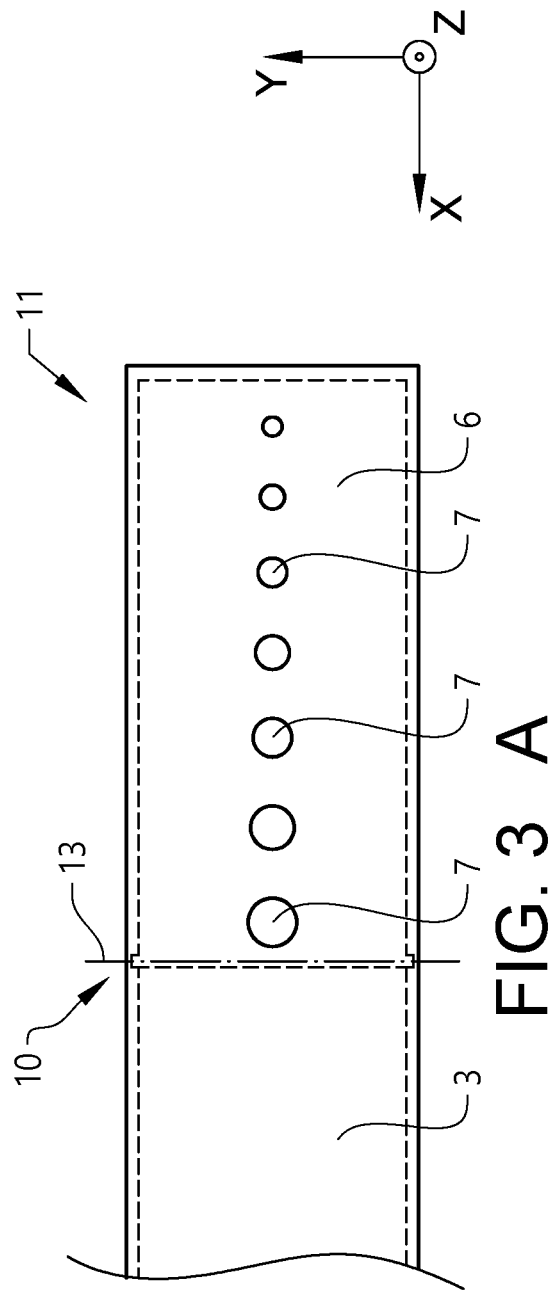
FIG. 3 is a view from below showing openings of a nozzle portion of the fresh air intake device in FIG. 2A.

FIG. 3 shows a view taken along A-A in FIG. 2A. In FIG. 3 showing the nozzle portion 6 in a view from below, the openings 7 of the nozzle portion 6 are arranged one after each other in the longitudinal extension direction of the pipe, i.e. in this case in the X-axis direction. The openings 7 are suitably arranged evenly spaced from each other along the nozzle portion 6. Further, in the example embodiment illustrated in FIG. 3, the openings 7 are arranged or distributed along substantially the entire nozzle portion, from the upstream end 10 to the downstream end 11 of the nozzle portion 6.

As also illustrated in FIG. 3, the sizes of the openings 7 can be different from each other such that the opening size decreases for the openings 7 along the nozzle portion 6 in a direction from the upstream end 10 of the nozzle portion 6 to the downstream end 11 of the nozzle portion 6. Optionally, the opening size can be the same for all the openings or if the equalization effect from the tapering of the air channel is to be somewhat counteracted, the opening size for the openings can increase along the nozzle portion in a direction from the upstream end of the nozzle portion to the downstream end of the nozzle portion.

Figure 2B:
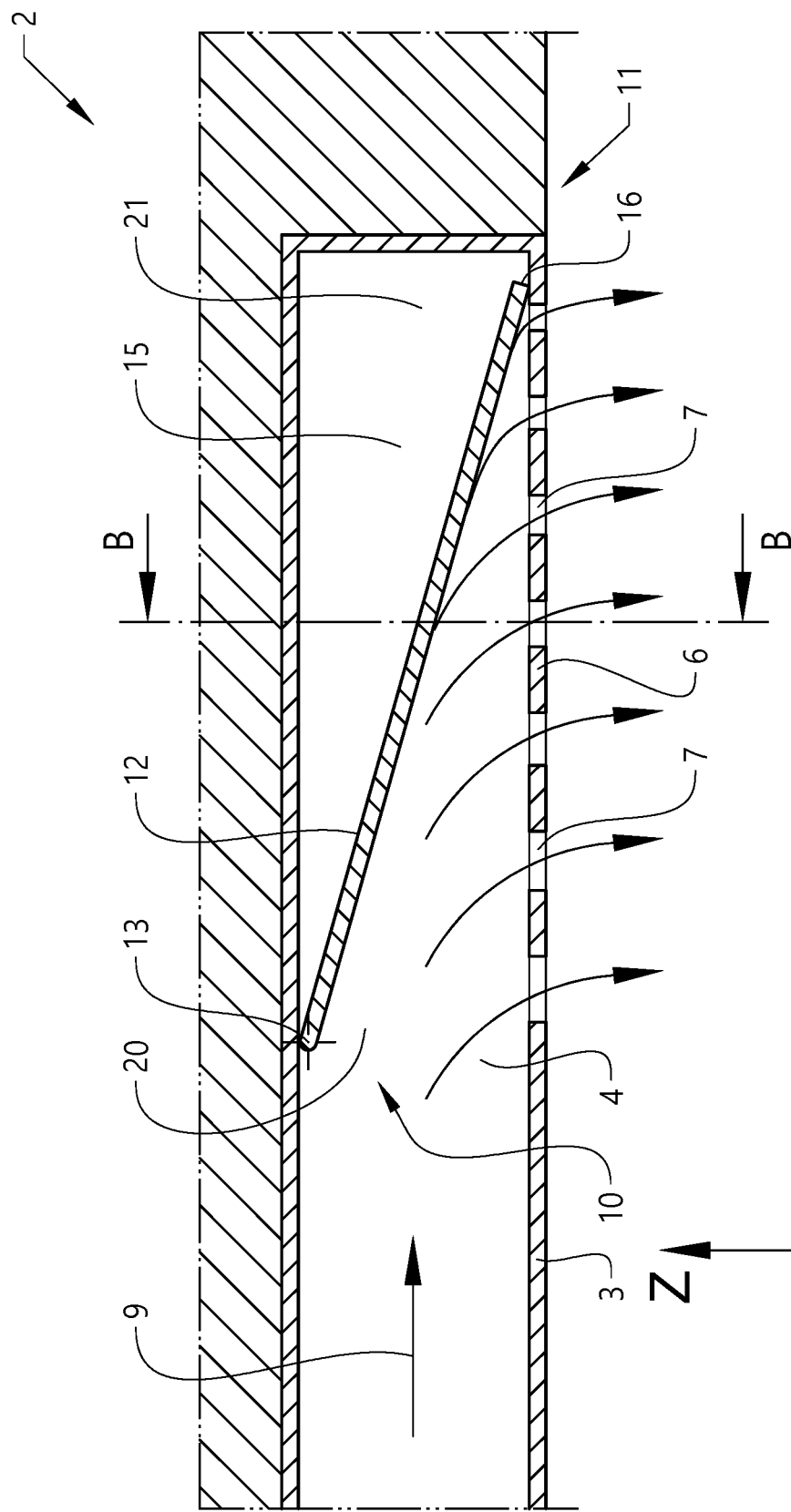
FIG. 2B shows the fresh air intake device in FIG. 2A, where the air channel of the pipe has been tapered by means of a pivot element.

With reference to FIG. 2A and FIG. 2B, a degree of taper of the air channel 4 in the longitudinal direction of the pipe 3 is adjustable for the nozzle portion 6 for equalizing the distribution of air flowing through the openings 7.

FIG. 2A shows the pipe 3 where the air channel 4 has a substantially constant cross section area, i.e. without any taper. FIG. 2B shows the pipe 3 where the air channel 4 is tapered.

When the taper of the air channel 4 of the nozzle portion 6 is adjusted, the air channel 4 is suitably tapered in the intended main airflow direction 9 of the pipe 3. The device 2 may comprise a pivot element 12 arranged inside the pipe 3, where the pivot element 12 is pivotally arranged relative to the pipe 3, and thereby the degree of taper of the air channel 4 of the nozzle portion 6 is adjustable by pivoting the pivot element 12. The pivot element can be a plate 12 or similar that can be driven by a drive unit which in turn can be operated by a passenger of the vehicle through any control device or by an automatic function of a HVAC-system for instance. In FIG. 2A, the pivot element 12 is in a first (upper) position, and in FIG. 2B, the pivot element is in a second (lower) position. The pivot element 12 is pivotally arranged relative to the pipe about a pivot point 13. The pivot element 12 has a first end comprising the pivot point 13 and a second free end 16, and preferably the pivot point 13 is arranged upstream the second free end 16. The pivot point 13 of the pivot element 12 is suitably arranged at a wall of the pipe opposite to the wall of the pipe having the openings 7, such that the cross section of the nozzle portion 6 can be reduced along the nozzle portion 6 while allowing air to flow through the openings 7, and into the cabin 5.

The taper of the air channel 4 of the nozzle portion 6 is suitably adjustable such that at a first position 20 of the nozzle portion 6, the air channel 4 has a first cross section area, and at a second position 21 of the nozzle portion 6, downstream the first position 20, the air channel 4 has a second cross section area being less than 75% of the first cross section area. The first position 20 can be the upstream end 10 of the nozzle portion 6 and the second position 21 can be the downstream end 11 of the nozzle portion 6. The taper of the air channel 4 of the nozzle portion 6 is preferably adjustable such that the second cross section area is less than 50% of the first cross section area, and more preferably less than 25% of the first cross section area.

The second cross section area of the air channel 4 of the nozzle portion 6 at the second position 21 can be varied. For example, the second cross section area can be variable in the interval 75-100%, suitably in the interval 50-100%, preferably in the interval 25-100%, and more preferably in the interval 0-100% of the first cross section area at the first position 20.

In the example embodiment illustrated in FIGS. 2A and 2B, the taper of the air channel 4 of the nozzle portion 6 is adjustable such that the second cross section area is substantially zero. The pivot element 12 is pivotable about an axis 13 in parallel with the Y-axis between the upper position and the lower position. The pivot axis 13 is arranged in the upper part of the pipe 3 close to the pipe wall 14. When the pivot element 12 is situated in the upper position illustrated in FIG. 2A, the cross section of the air channel 4 of the nozzle portion 6 is substantially constant, i.e. there is no tapering. When the pivot element 12 is situated in the lower position illustrated in FIG. 2B, the cross section of the air channel 4 of the nozzle portion 6 decreases in the main air flow direction 9, i.e. the air channel is tapered, since the space 15 downstream the pivot element 12 is blocked by the pivot element 12.

At the end 16 of the pivot element 12, the air channel cross section area is zero. The degree of taper of the air channel 4 of the nozzle portion 6 can be continuously adjustable by allowing any position of the pivot element 12 between the upper position and the lower position to be selected. The cross section area referred to is of course the cross section area of the air cannel 4 where the main air flow takes place, not any cross section area downstream the pivot element 12 that is blocked by the pivot element 12.

When the taper of the air channel 4 of the nozzle portion 6 is adjusted, optionally a plurality of the openings 7a of the nozzle portion 6 can be situated upstream the second position 21b, and a plurality of the openings 7b of the nozzle portion 6 can be situated downstream the second position 21b. See FIG. 2C.

Particularly, when the second cross section area at the second position 21b is substantially zero, the openings 7b situated downstream the second position 21b are blocked from the main airflow and will not contribute to any airflow into the cabin 5 of the vehicle 1. In this case, the airflow through the openings 7a at the upstream end 10 of the nozzle portion 6, can be even more increased. Please note that in this example embodiment, the second position 21b is different from the downstream end 11 of the nozzle portion 6.

Figure 2C:
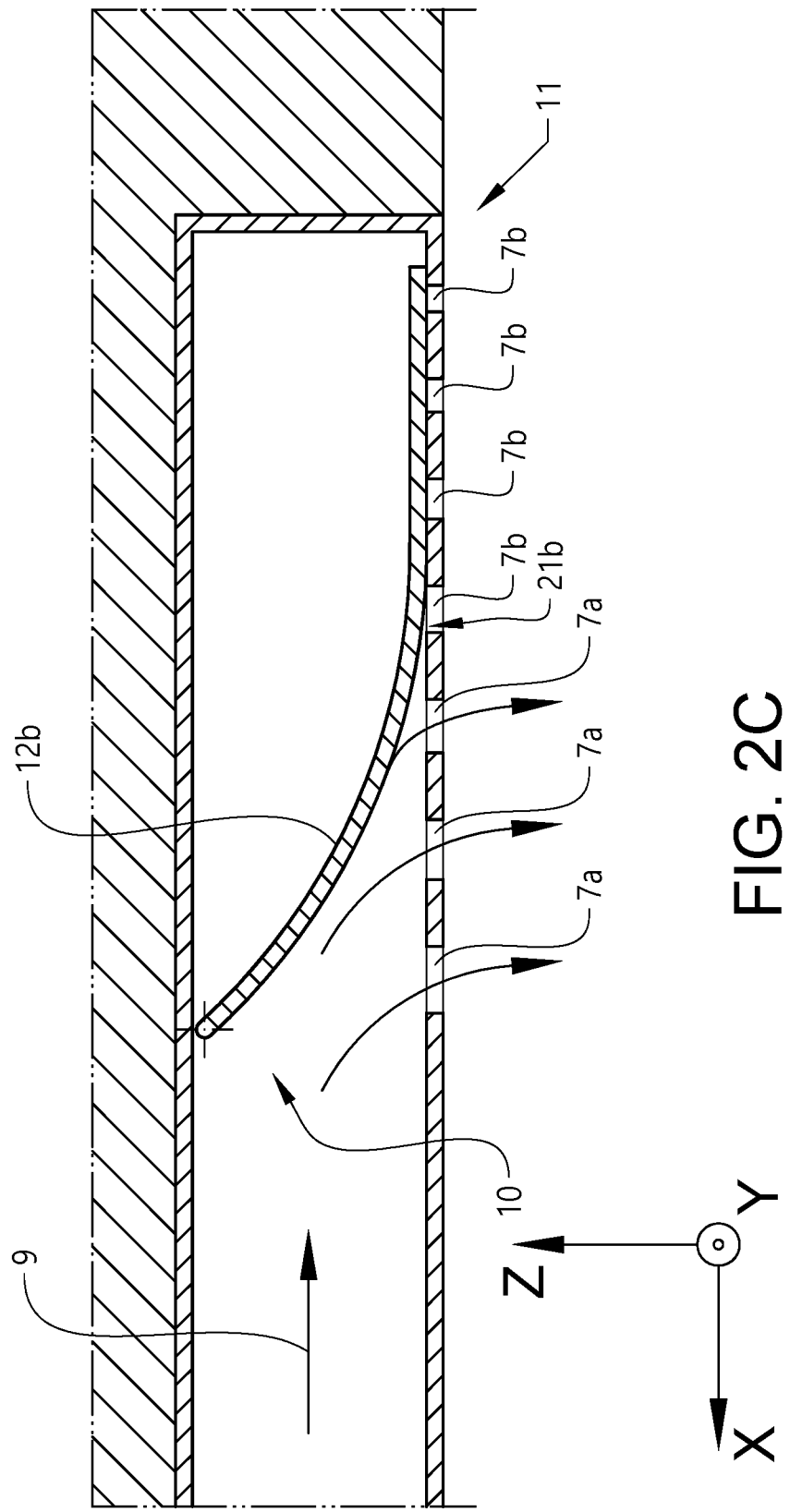
FIG. 2C shows the fresh air intake device in FIG. 2B, where the device has an alternative pivot element.

Although the air channel 4 of the nozzle portion 6 can be linearly tapered when being adjusted, as illustrated in FIG. 2B when using a straight pivot element 12, optionally the pivot element 12b can be curved or bent for achieving a non-linearly tapered air channel, as illustrated in FIG. 2C showing an example embodiment where the pivot element is curved. Such a curved pivot element may also facilitate tight contact between the pivot element 12b and the pipe wall having the openings, such that some of the openings 7b will be situated downstream the pivot element 12b and/or blocked from the main air flow in the pipe 3.

FIG. 2D shows a further example embodiment where a part 12c of the wall 14 of the pipe 3 is pivotally arranged about the pivot axis 13c, relative to the remaining pipe, and the degree of taper of the air channel 4 of the nozzle portion 6 is adjustable by pivoting the pipe wall part 12c. Optionally, above the pipe wall part 12c another stationary wall 17 can be used for further sealing the pipe 3 to the surrounding, should there be any leakage between the pivotable pipe wall part 12c and the remaining pipe.

Figure 4:
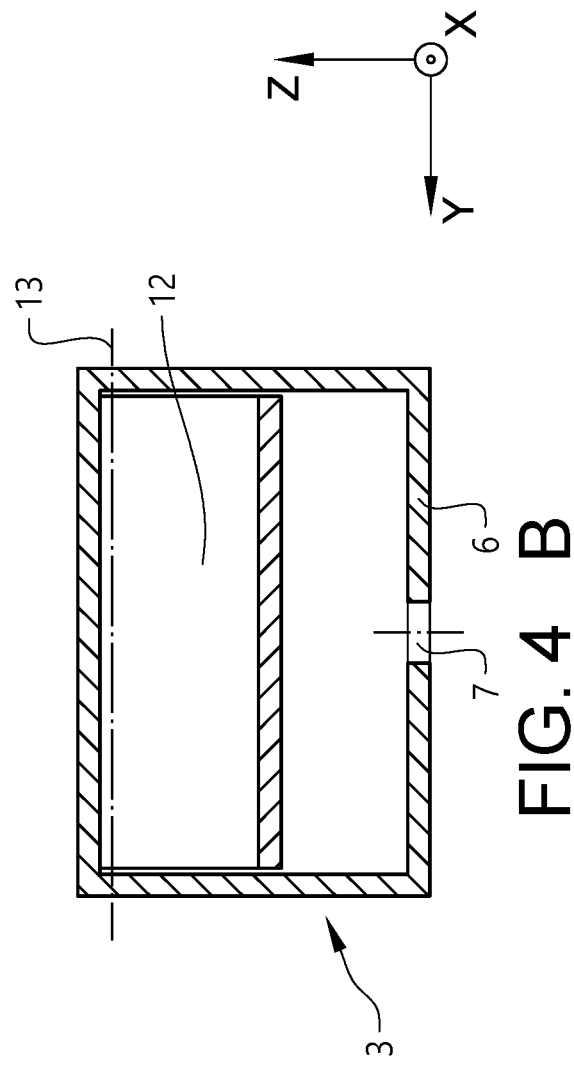
FIG. 4 is a cut view showing the cross section of the nozzle portion of the fresh air intake device in FIG. 2B.

FIG. 4 shows a cross section view taken along B-B in FIG. 2B. In all example embodiments, the nozzle portion 6 of the pipe 3 suitably has a quadrilateral cross section, such as a rectangular or square cross section. In the example embodiments illustrated, this cross section extends in the ZY-plane. Such a cross section can be favourable in comparison to a circular cross section for instance, since the taper can be adjusted while effectively blocking the desired part of the air channel and maintaining the pipe sealed allowing airflow through the openings only.

It is to be understood that the present invention is not limited to the embodiments described above and illustrated in the drawings; rather, the skilled person will recognize that many changes and modifications may be made within the scope of the appended claims.

What is claimed is:

1. A fresh air intake device for a vehicle, the device comprising a pipe with a channel for providing air to a cabin of the vehicle, the pipe having a nozzle portion with a plurality of openings for distributing air into the cabin, the openings of the nozzle portion being arranged one after each other in a longitudinal extension direction of the pipe, wherein a degree of taper of the air channel in the longitudinal extension direction of the pipe is adjustable for the nozzle portion for equalizing the distribution of air flowing through the openings.

2. The device according to claim 1, wherein the nozzle portion constitutes an end portion of the pipe.

3. The device according to claim 1, wherein the taper of the air channel of the nozzle portion is adjustable such that at a first position of the nozzle portion, the air channel has a first cross section area, and at a second position of the nozzle portion, downstream the first position, the air channel has a second cross section area being less than 75% of the first cross section area.

4. The device according to claim 3, wherein the taper of the air channel of the nozzle portion is adjustable such that the second cross section area is less than 50% of the first cross section area.

5. The device according to claim 3, wherein the taper of the air channel of the nozzle portion is adjustable such that the second cross section area is less than 25% of the first cross section area.

6. The device according to claim 3, wherein the taper of the air channel of the nozzle portion is adjustable such that the second cross section area is substantially zero.

7. The device according to claim 3, wherein when the taper of the air channel of the nozzle portion is adjusted, a plurality of the openings of the nozzle portion are situated upstream the second position, and a plurality of the openings of the nozzle portion are situated downstream the second position.

8. The device according to claim 1, wherein each opening of the nozzle portion has a direction with a radial direction component transverse to the longitudinal extension direction of the pipe.

9. The device according to claim 1, wherein the openings are arranged evenly spaced from each other along the nozzle portion.

10. The device according to claim 1, wherein the sizes of the openings are different such that the opening size decreases along the nozzle portion in a direction from a first end of the nozzle portion to a second opposite end of the nozzle portion downstream the first end.

11. The device according to claim 1, wherein the degree of taper of the air channel of the nozzle portion is continuously adjustable.

12. The device according to claim 1, wherein when the taper of the air channel of the nozzle portion is adjusted, the air channel is tapered in an intended main airflow direction of the pipe.

13. The device according to claim 1, wherein the device comprises a pivot element arranged inside the pipe, the pivot element being pivotally arranged relative to the pipe, the degree of taper of the air channel of the nozzle portion being adjustable by pivoting the pivot element.

14. The device according to claim 13, wherein the pivot element is pivotally arranged relative to the pipe about a pivot point, the pivot element having a first end comprising the pivot point and a second free end, the pivot point being arranged upstream the second free end.

15. The device according to claim 1, wherein a part of a wall of the pipe is pivotally arranged relative to the remaining pipe, the degree of taper of the air channel of the nozzle portion being adjustable by pivoting the pipe wall part.

16. A vehicle comprising the device according to claim 1.

* * * * *